United States Patent [19]
Niederlein et al.

[11] Patent Number: 5,537,371
[45] Date of Patent: Jul. 16, 1996

[54] DISK PLAY-BACK DEVICE WITH REMOVABLE DISK MAGAZINES

[75] Inventors: Horst Niederlein; Boerge Heidersberger, both of Bingen, Germany

[73] Assignee: NSM Aktiengesellschaft, Bingen, Germany

[21] Appl. No.: 256,742
[22] PCT Filed: Jan. 18, 1993
[86] PCT No.: PCT/DE93/00046
§ 371 Date: Jul. 21, 1994
§ 102(e) Date: Jul. 21, 1994
[87] PCT Pub. No.: WO93/14499
PCT Pub. Date: Jul. 22, 1993

[30] Foreign Application Priority Data

Jan. 21, 1992 [DE] Germany .......................... 42 01 465.4

[51] Int. Cl.⁶ ..................................................... G11B 17/22
[52] U.S. Cl. ............................................................. 369/36
[58] Field of Search ................................ 369/36, 38, 178, 369/191–194, 77.1, 77.2; 360/92, 98.04, 99.02

[56] References Cited

U.S. PATENT DOCUMENTS 5,228,016  7/1993  Menke ........................................ 369/36
5,255,251  10/1993  Fitzgerald et al. ....................... 369/192

FOREIGN PATENT DOCUMENTS 0139327  5/1985  European Pat. Off. ................. 369/36

*Primary Examiner*—Stuart S. Levy
*Assistant Examiner*—Allen Cao
*Attorney, Agent, or Firm*—Spencer & Frank

[57] ABSTRACT

A disk play-back device includes a housing having an upper and a lower wall each having a respective opening. At least one exchangeable disk magazine is provided that contains superposed disk holders and that is insertable into the housing between the upper and lower walls. The disk magazine includes a front wall having a plurality of recesses formed therein, and a bottom and a top wall each having an opening in registration with the respective openings of the housing when the magazine is inserted in the housing. A catch device is located on the front wall of the disk magazine for fixing the disk magazine in position in the housing. The catch device includes a pressure spring having two ends, and two levers. Each lever is located behind a respective recess, and each has a front end facing the other front end. The front end includes a centered projecting pin with a respective end of the pressure spring being pushed thereon for pre-stressing and moving the levers in opposite directions to engage with the associated openings of the housing. The levers further include another end narrowing to form a neck opposite of the respective projecting pin. The neck is guided in a respective opening of the magazine and is extendable through the respective opening of the housing. The catch device includes a manually-operable gripping projection formed on each lever and projecting into the respective recess.

3 Claims, 3 Drawing Sheets

DISK PLAY-BACK DEVICE WITH REMOVABLE DISK MAGAZINES

BACKGROUND OF THE INVENTION

The invention relates to a disk play-back device with at least one disk magazine exchangeably disposed in the housing of the device, which is fixed in its position in respect to the housing by means of a catch device and has disk holders which are placed in compartments above each other and hold respectively one disk.

A CD play-back device with two oppositely located, exchangeable disk magazines, which are equipped with disk holders placed in horizontal compartments and respectively receiving one disk, is known from DE 39 22 721 A1. A transport device which can be moved in the stack direction of the disk magazines conveys a desired disk, together with the associated disk holder, back and forth between the compartment of the respective disk magazine and a play-back unit. It is customary in connection with such devices to have a plurality of disk magazines with a single device and to stock the individual disk magazines with disks from a defined field of music, such as classics, rock, jazz, etc. For protection against dust, the disk magazines which are not placed into the disk play-back device are usually stored in separate boxes, to which respectively one container for the protective sleeves of the disks stored in the disk magazine is assigned.

Each disk magazine of the known play-back device is maintained in its fixed position by means of two catches disposed on the front of the housing of the device, which consist of a spring mechanism respectively located at the top and the bottom. Both catches are connected via rods with a displacement lever on the housing. With the movement of the displacement lever in one direction, the first catch is released, so that the disk magazine can be pivoted around a pivot shaft out of the housing in order to ease in this way the exchange of the disks stored in the disk holders. With a movement of the displacement lever in the other direction, the second catch is also released, because of which it is possible to remove the disk magazine as a whole from the housing. However, in the course of pivoting the disk magazine out as well as when removing it, it is necessary for the transport device to be in the end position below the level of the bottom of the disk magazine, which therefore requires a special monitoring function of the position of the transport device when exchanging the disk magazine. In addition, the rotational and translatorial movement of the disk magazine in the course of its exchange requires a relatively elaborate construction of the two catches consisting of respectively two spring mechanisms.

SUMMARY OF THE INVENTION

It is the object of the invention to provide a disk play-back device of the type mentioned at the outset wherein the exchange of the disk magazine is assured in a quick and simple manner.

This object is attained in accordance with the invention in that the disk magazine is inserted from the front of the housing in the manner of a drawer.

Because of this step, only translatory movements are required when replacing the disk magazine with another one, which can be performed without regard of the position of the transport device for disk transport, which is disposed next to the disk magazine, and the ease of operation is considerably increased by this. In addition, the design of the disk magazine as a drawer provides the option of keeping the construction of the catch device simple, because only the sliding movement of the disk magazine needs to be limited.

In accordance with an advantageous embodiment of the invention, at least one groove and tongue guide is provided between the disk magazine and the housing to achieve the dependable insertion and removal of the disk magazine from the housing of the play-back device. Suitably, respectively one groove and tongue guide is provided on the bottom as well as on the top wall of the disk magazine for increasing stability.

In accordance with an advantageous further embodiment of the invention, the tongue of the tongue and groove guide is provided with oppositely located chamfers and its front end, and the groove with a corresponding widening at its rear end to ease the inserting process of the disk magazine into the housing. In this case the front end of the tongue is preferably used as a stop for the bottom wall of the groove, which is in the form of a blind bore, in order to limit the inserting movement of the disk magazine.

In an advantageous embodiment of the subject of the invention, the catch device is disposed on the front wall of the disk magazine and comprises two levers, which are pre-stressed by means of a pressure spring and can be moved in opposite directions to each other and cooperate with corresponding openings in the intermediate walls of the housing. On the one hand, this results in a space-saving placement of the catch device and, on the other, in a structurally simple, easy to manipulate catch device.

In accordance with an advantageous further embodiment of the subject of the invention, the levers of the catch device, which are placed above each other and are aligned with each other, are located between two oppositely placed guide rails formed on the back of the front wall of the disk magazine and are respectively limited in the direction of their movements by a peg, fixed on the back of the front wall and engaging a corresponding elongated hole of the associated lever. This assures a particularly dependable operation of the catch device.

In accordance with an advantageous further embodiment of the invention, a recess in the front wall of the disk magazine, in which a gripping projection is situated which is formed on the lever located behind the recess, is associated with each lever, so that the catch device can be operated in a simple manner. Accordingly, it is only necessary to move the two gripping projections toward each other against the force of the pressure spring for releasing the catch device, and after the gripping projections have been released, the levers return automatically into their locking position under the force of the pressure spring.

For achieving a simple assembly it has been further advantageously provided that the fronts of the levers which are located opposite each other respectively have a centered projecting peg on which the free ends of the pressure spring have been pushed. In the process, suitably each lever makes a transition into a narrow neck on the front opposite the peg, which is guided in a corresponding opening in the bottom or the top wall of the disk magazine and which, in the locked position of the disk magazine, extends through the associated opening of the corresponding intermediate wall of the housing.

In an advantageous further embodiment of the invention, to prevent the lever from buckling out of the back of the front wall of the disk magazine, the backs of the levers are covered by a strip extending between the top wall and the bottom of the disk magazine, which is composed of spring elements for keeping in place the disk holders respectively containing a disk and inserted into compartments of the disk magazine.

The concept on which the invention is based will be explained in detail in the following description by means of an exemplary embodiment shown in the drawings. Shown are in:

DETAILED DESCRIPTION OF THE INVENTION

Figure 1:
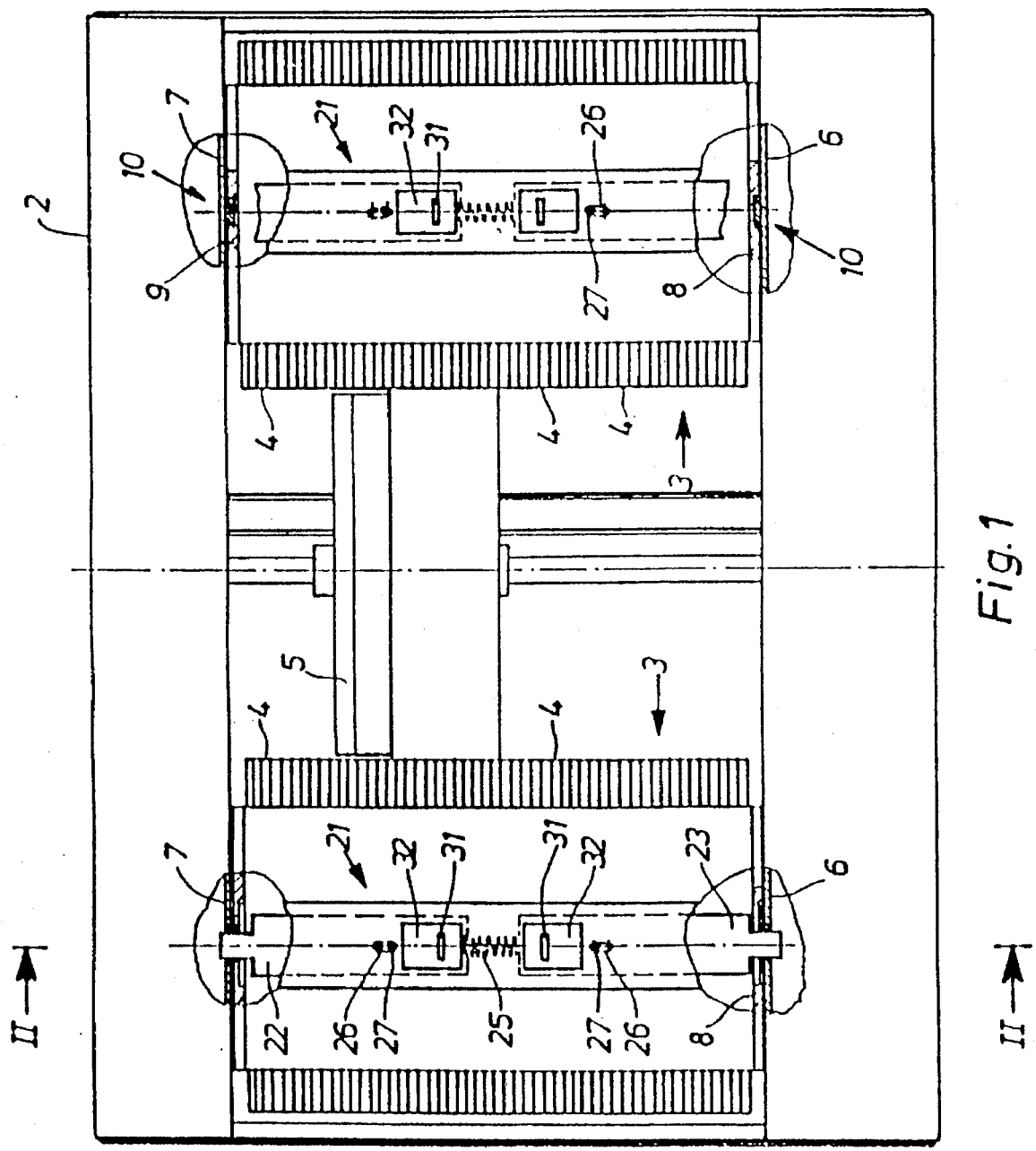
FIG. 1, a front view of a disk play-back device in accordance with the invention in different partial sections, FIG. 2, a section through the representation of FIG. 1 along the line II—II, but without the strip covering the back of the levers, and FIG. 3, a partial top view of the right, lower part of the housing of the disk play-back device with a disk magazine disposed in the insertion direction in front of it.
Figure 2:
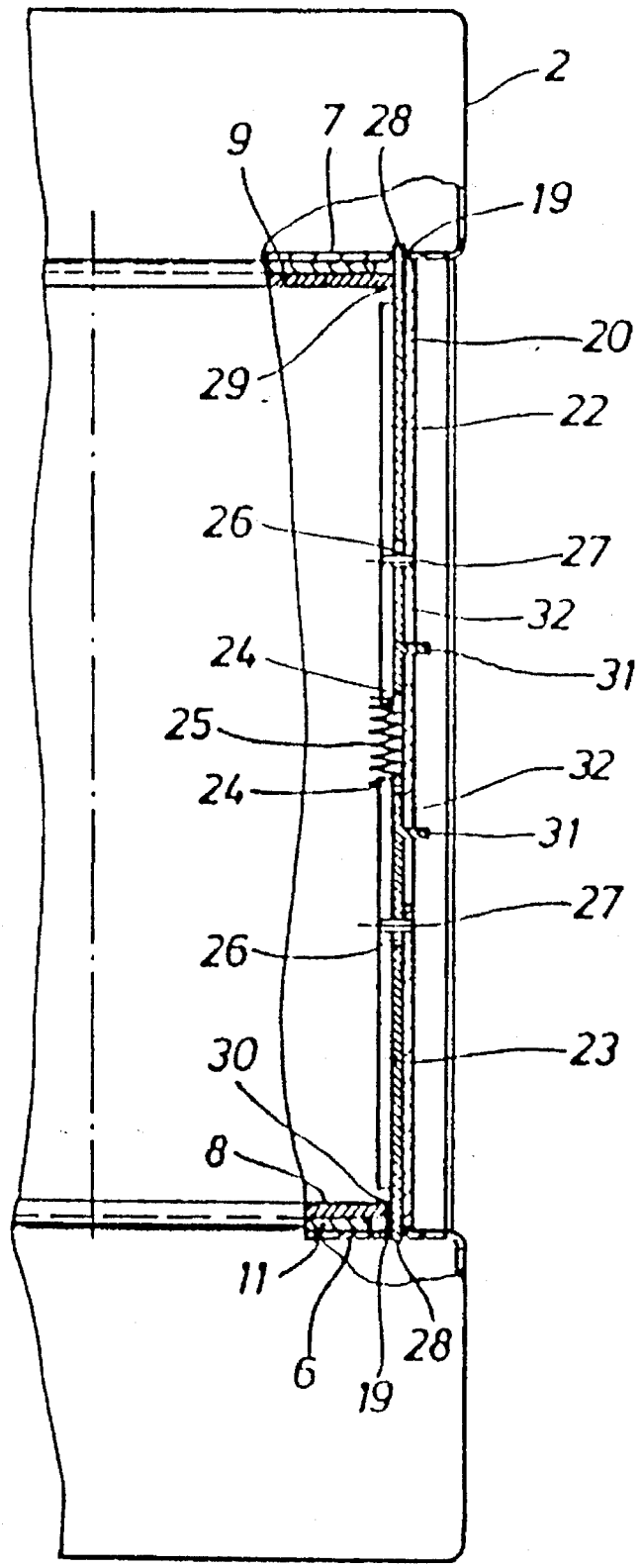
Figure 3:
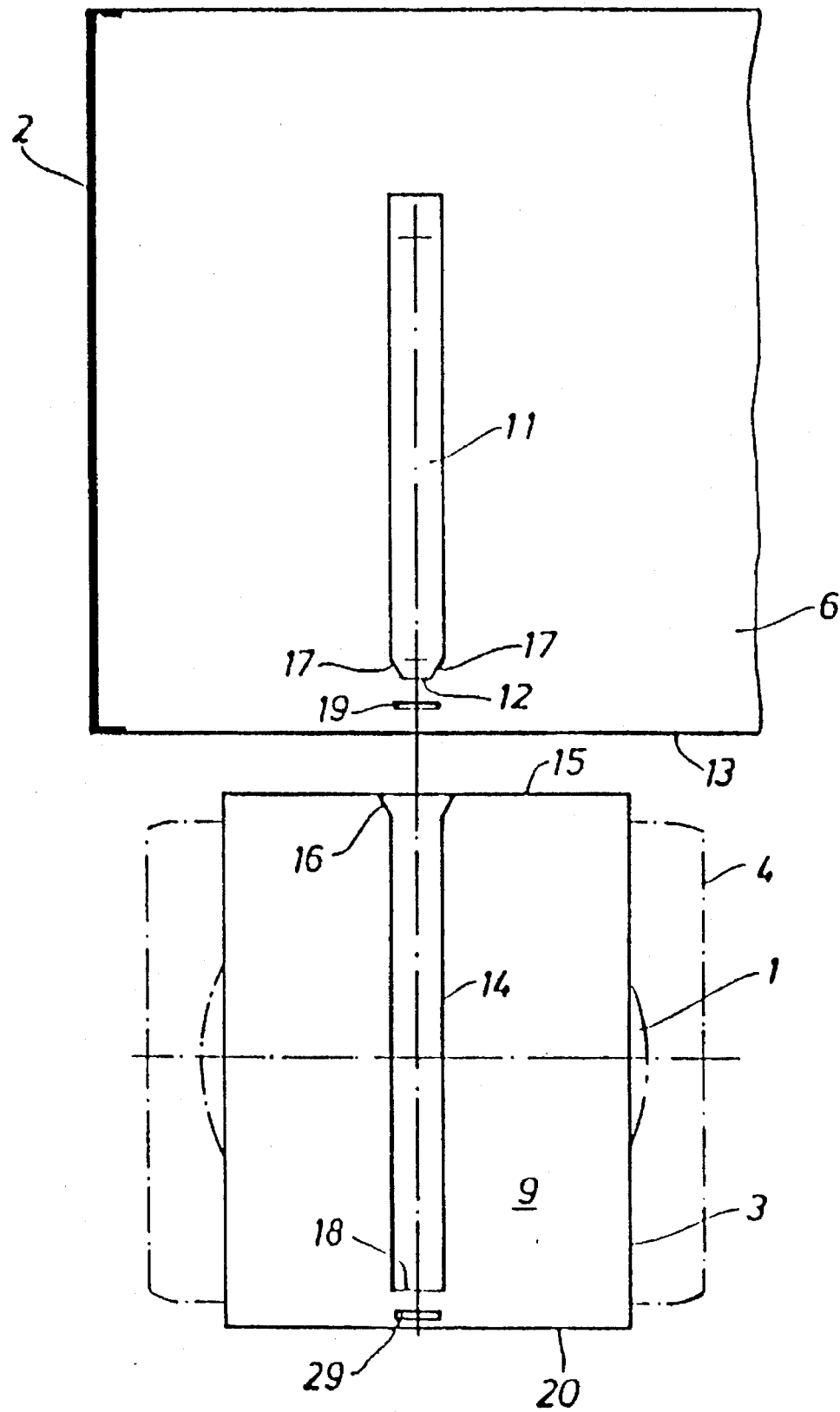

The disk play-back device by means of which it is possible to read out optically and reproduce information stored on disks 1, has a housing 2 with an associated operating console, not shown, which has different keys, for example a disk selection key, a disk playing key and a stop key. Two disk magazines 3 are laterally disposed in the housing 2, which are identically constructed and respectively have a plurality of compartments arranged on top of each other for storing a corresponding number of disk holders 4, each receiving respectively one disk 1. A transport device 5 which can be moved up and down for taking a desired disk 1 with the associated disk holder 4 back and forth between the compartment and a play-back unit is located in the space between the disk magazines 3. The play-back unit, not shown, having a motor for rotating the disk turntable and a play-back head, is fixedly disposed between the two disk magazines 3 and below their level.

A lower intermediate wall 6 and an upper intermediate wall 7 of the housing 2 are associated with each disk magazine 3 inside the housing 2, and between them receive the disk magazine 3 inserted in the manner of a drawer from the front of the housing 2. Respectively one tongue and groove guide 10 is provided between the lower intermediate wall 6 and the bottom 8 of the disk magazine 3 and between the upper intermediate wall 7 and the top wall 9 of the disk magazine 3. Each tongue and groove guide 10 consists of a tongue 11, extending in the insertion direction of the disk magazine 3 and formed on the lower intermediate wall 6 or the upper intermediate wall 7, the front face 12 of which has a defined spacing from the front edge 13 of the respective intermediate wall 6 or 7, and of a correspondingly embodied groove 14 in the bottom 8 or the top wall 9 of the disk magazine 3. The groove 14, embodied in the manner of a blind bore, has a widening (tapered region) 16 on its open end in the area of the back wall 15 of the disk magazine 3, which in the course of the insertion operation of the disk magazine 3 cooperates with oppositely located chamfers 17 of the front face 12 of the tongue 11. The length of the tongue 11 corresponds to the length of the groove 14, so that the bottom wall 18 rests against the front face 12 of the tongue 11 in the inserted state of the disk magazine, the result of which is a limitation of the insertion movement of the disk magazine 3.

An opening 19 is cut into the respective intermediate wall 6, 7 between the front edge 13 of the intermediate walls 6, 7 and the front face 12 of the respectively associated tongue 11, which is associated with a catch device 21 attached to the front wall 20 of the disk magazine 3.

The catch device 21 comprises two levers 22, 23, which are disposed in the longitudinal direction above each other at a distance and are U-shaped in cross section, are aligned with each other and are slidingly movable between guide rails formed on the back of the front wall 20 of the disk magazine 3. A strip of spring elements, not shown, for keeping in place the disk holder 4, containing respectively one disk 1, in the compartments of the disk magazine 3, covers the back of the two levers 22, 23, one end of the strip being fastened on the top wall 9 and the other on the bottom 8 of the disk magazine 3. A projecting peg 24, on which the free ends of a pressure spring 25 located inbetween have been pushed, is located centered on the front faces of the levers 22, 23 facing each other. To limit the movement of the levers 22, 23 away from each other under the force of the pressure spring 25, each lever 22, 23 has an elongated hole 26 which is engaged by a peg 27 fixed on the front wall 20. On its free end each lever 22, 23 makes a transition into a narrow neck 28. The neck 28 of the lever 22 extends through an opening 29 in the top wall 9, and in the locked position of the disk magazine 3 engages the opening 19 of the upper intermediate wall 7, while the neck 28 of the lever 23 extends through an opening 30 in the bottom 8 and engages the opening 19 of the lower intermediate wall 6 in the locked position of the disk magazine 3. The insertion and removal movement of the necks 28 of the levers 22, 23 in relation to the openings 19 is determined by the size of the elongated holes 26 cooperating with the pegs 27. In order to release the levers 22, 23 from their locking position against the force of the spring 25, each lever 22, 23 has a gripping projection 31 extending through an associated recess 32 in the front wall 20. In this way it is possible to release the locking of the disk magazine 3 with the housing 2 by pressing together the gripping projections 31, and the disk magazine can be pulled out of the housing in the manner of a drawer. In the course of inserting the disk magazine 3 into the housing 2, the necks 28 of the levers 22, 23 compress the pressure spring 25 and slide on the intermediate walls 7, 6 until the necks 28 of the levers 22, 23 catch the associated opening 19 of the intermediate wall 7, 6 under the action of the pressure spring 25, so that the disk magazine 3 is locked in its insertion position within the housing 2 of the disk play-back device.

The exemplary embodiment described shows the particularly simple and convenient to manipulate construction of the disk play-back device of the invention which, regardless of its simplicity, has proven to be particularly dependable in connection with the exchangeabilty of the disk magazines. Although the invention has been described by means of only one exemplary embodiment, for one skilled in the art obvious variants of the object of the invention ensuing from this representation are within the scope of the claimed play-back device.

We claim:

1. A disk play-back device comprising:
   a housing having an upper and a lower wall each having a respective opening;
   at least one exchangeable disk magazine containing superposed disk holders and being insertable into said housing between said upper and lower walls, said disk magazine including a front wall having a plurality of recesses formed therein, and a bottom and a top wall each having an opening in registration with the respective openings of said housing when said magazine is inserted in said housing; and a catch device located on the front wall of said disk magazine for fixing said disk magazine in position in said housing, and comprising:

a pressure spring having two ends;

two levers, each located behind a respective recess of said plurality of recesses, and each having:

a front end facing the other front end, and including a centered projecting pin with a respective end of said pressure spring being pushed thereon for pre-stressing and moving said levers in opposite directions to engage with the associated openings of said housing; and another end narrowing to form a neck opposite of the respective projecting pin, said neck being guided in a respective opening of said magazine and being extendable through the respective opening of said housing; and a manually-operable gripping projection formed on each lever and projecting into the respective recess.

2. A disk play-back device in accordance with claim 1, wherein said front wall of said disk magazine includes a back having two oppositely placed guide rails formed thereon, and a peg fixed thereto, said levers being located above each other in the longitudinal direction and being aligned with each other, said levers each including an elongated hole, and each being located between the two oppositely placed guide rails and being respectively limited in movement by said peg which engages the corresponding elongated hole of the respective lever.

3. A disk play-back device in accordance with claim 1, further comprising a strip extending between the top wall and the bottom wall of said disk magazine and covering a back of said levers, said strip comprising spring elements for keeping in place the disk holders inserted into compartments of said disk magazine.

* * * * *